United States Patent [19]

Star

[11] Patent Number: 4,570,733
[45] Date of Patent: * Feb. 18, 1986

[54] MOBILE HOSPITAL UNIT

[76] Inventor: Leon D. Star, Bldg. #198, Kennedy International Airport, Jamaica, N.Y. 11430

[*] Notice: The portion of the term of this patent subsequent to Jan. 17, 2001 has been disclaimed.

[21] Appl. No.: 604,329

[22] Filed: Apr. 26, 1984

[51] Int. Cl.⁴ .............................................. B62D 47/00
[52] U.S. Cl. ................................. 180/41; 280/414.5; 280/6 H; 280/6.1
[58] Field of Search .............. 180/41; 280/414.5, 6 R, 280/6 H, 6.1, 43.17, 43.23

[56] References Cited

U.S. PATENT DOCUMENTS

| | | | |
|---|---|---|---|
| 2,774,606 | 12/1956 | Burweger et al. | 280/414.5 |
| 3,386,747 | 6/1968 | Watt | 280/6 R |
| 3,393,761 | 7/1968 | Greulich | 180/41 X |
| 3,788,683 | 1/1974 | Rumell | 280/43.23 X |
| 3,917,307 | 11/1975 | Shoebridge | 280/6 H X |
| 4,181,347 | 1/1980 | Clark | 296/1 R |
| 4,425,978 | 1/1984 | Star | 180/243 |

*Primary Examiner*—Richard E. Gluck
*Attorney, Agent, or Firm*—Bauer & Amer

[57] ABSTRACT

A standard cargo container is reconstructed into a readily transportable hospital unit for providing emergency treatment to injured survivors at a site of a major disaster, wherein the structural features embodied by the container contribute to its transportability to the disaster site (except, of course, instead of cargo, the container houses medical facilities and supplies), and subsequently at the site the container has surface transportability as a result of an internal combustion engine-operated four-wheel drive which is supplemented by a rear pair of idler wheels that are vertically extendable and retractable so as to maintain a horizontal orientation in the container during the loading and unloading thereof from a cargo-type aircraft.

2 Claims, 6 Drawing Figures

MOBILE HOSPITAL UNIT

The present invention relates generally to a hospital unit for use in providing emergency medical treatment at the actual scene or site of a major disaster, and more particularly, to structural features embodied by the within hospital unit which contribute to its transportability by airlift or the like to the disaster site, and its surface transportability or mobility at the site.

It is known that major accidents, such as the crashing of large passenger aircraft at or near airports, as well as earthquakes and other such natural disasters, are survivable if modern emergency treatment for injured survivors can be effectively provided. The emergency treatment, moreover, must be administered at the disaster site, since for any one or more reasons the injured survivors usually cannot be removed from the disaster site to a hospital preparatory to receiving such treatment. In the case of an air crash, for example, there might be literally hundreds of survivors of widely varying injuries and not nearly enough emergency vehicles available to transport these casualties, even assuming the most favorable road conditions for the operation of such vehicles.

Underlying the present invention is the recognition, therefore, that the necessary medical equipment and personnel for providing emergency medical treatment must in the first instance be transported to the disaster site, since, otherwise, it cannot be realistically expected that these survivors can be removed to a remotely located hospital to receive the care that is necessary. To implement this, there is herein proposed a readily transportable structure, adapted without mishap to be airlifted or otherwise taken to the disaster site, and further adapted at the site to be mobile or have surface transportability to correspondingly further enhance its use as a medical-dispensing unit to the injured survivors thereat. The transportability as just described is furthermore achieved at nominal sacrifice in the size of the structure, in that it is large enough to adequately house considerable medical equipment and supplies, all as is explained in detail subsequently herein.

One hospital unit which is adequate for the end use noted is the unit illustrated and described in my prior U.S. Pat. No. 4,425,978, which is incorporated herein by this reference. However, instead of using independently hydraulically operated rear wheels for both powering the unit during surface transportation and also for maintaining a horizontal orientation thereof during the loading and unloading thereof from a cargo-type aircraft, a greatly simplified operating mode is herein embodied in the within inventive hospital unit.

Thus, a hospital unit, adapted to be transported by airlift as well as having surface mobility, demonstrating objects and advantages of the present invention includes a body formed of a standard cargo container of the type capable of airlift transportation so that it also can be airlifted to a selected location in the immediate vicinity of a disaster site. Such container is also adequately sized to bound an internal area of approximately eight feet in width, eight feet in height and forty feet in length and has been found in practice to provide enough room for storage of medical equipment and facilities for the purposes intended. A four-wheel drive is operatively embodied in the aforesaid container and is adapted to provide surface transportability thereto for movement of the container from any disaster site selected location to the injured survivors thereat. According to the present invention, the referred to four-wheel drive consists of an internal combustion engine operated pair of front and rear wheels for surface transportability and, slightly rearwardly of the rear wheels, a pair of idler wheels mounted on pistons that are selectively independently adapted to be urged through movement to selected clearance positions from the container incident to maintaining a horizontal orientation in the container. This ascending and descending movement in the rear idler wheels has been found in practice to effectively replace the costly hydraulically powered wheels, which surprisingly it has been found are needed only for surface transportation, in that such movement eliminates any problems in the ability of the container to ascend or descend a loading ramp of a cargo aircraft without causing displacement of the contents or personnel therein. That is, with the idler wheels properly extended to maintain a horizontal orientation in the container, it has been surprisingly found that there is sufficient power in the front wheels to enable the container to surmount the typical angled loading ramp of a cargo aircraft.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
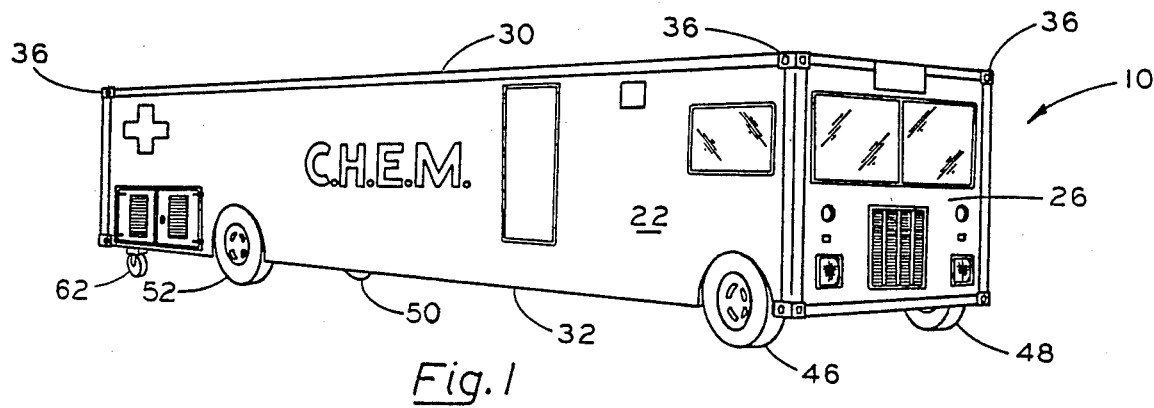
FIG. 1 is a perspective view of an emergency medical unit having surface transportability and otherwise demonstrating objects and advantages of the present invention.

The emergency hospital unit according to the present invention, generally designated 10, is intended to solve problems resulting from major accidents, such as the crashing of large passenger aircraft on or near airports, as well as problems associated with natural disasters such as earthquakes, flood and tornados. Underlying the present invention is the recognition that the referred to disasters are survivable if modern emergency care for injured survivors can be effectively provided. This in turn requires that equipment necessary for getting comprehensive, sophisticated medical care, and trained personnel, from physicians down to litter-bearers, be provided at the disaster site. More simply put, it is a fundamental concept underlying the present invention that the proper medical equipment and personnel must be transported to the disaster site since it cannot be realistically expected that the injured survivors can be transported to a hospital in order to receive emergency treatment, which should be provided as promplty as possible following the accident. Rather, such emergency treatment must be provided at the disaster site for any one of several reasons that are the practical result of a major disaster. For example, most hospitals in a metropolitan area are usually full, and or at least can be expected to be full, at the time of a disaster. Also, road conditions generally are not favorable after a disaster due to possibly weather conditions, normal heavy traffic, or even the morbid curiousity of those interested in witnessing an unpleasant event. Still further, the number of emergency vehicles available at any given time is usually not sufficient to transport several hundred casualties immediately to hospitals and in a modern aircraft, such as a DC-10, there may be as many as 370 passengers, which could result in literally hundreds of survivors of widely varying injuries as a result of a major disaster. For the foregoing and other reasons, it is, therefore, necessary that there be available for transit to the site of a manjor disaster of the appropriate emergency medical unit, such as unit 10 thereof.

While the structural details of unit 10 will, of course, be explained in detail subsequently, it is helpful at this point to note generally the attributes of a preferred commercial embodiment. More particularly, a unit 10 demonstrating objects and advantages of the present invention is a modification of a standard sea cargo container which, as is generally known, is usally 8 feet in width, 8.5 feet in height and 40 feet long. This external size in practice provides an adequately sized internal area 12 for storage of necessary medical equipment and facilities such as stretcher beds 14, preferably twenty four in number, an oxygen supply (not shown), and an operating table 16, to mention just a few of the important items of medical equipment which, of course, will be understood to be only exemplary of the type of medical equipment and facilities that must be on hand and available in the unit 10 for use in providing emergency treatment to injured survivors of a major disaster. In addition, it will be understood that a commercial embodiment of the unit 10 will have a self-contained generator (not shown) capable of providing electrical power, heat and air conditioning. What will now be described in detail are the attributes of the unit 10 which render it self-transportable on surface roads, as well as being capable of being airlifted by a C-130 cargo plane. Also, since unit 10 is a converted standard sea cargo container, it will, of course, also be understood that it can be transported by sea or rail.

As has been just noted, the mobile unit 10 is comprised basically of a standard cargo container, generally designated 20 and as such, is rectangularly shaped, and has opposite side walls 22 and 24, and opposite end walls 26 and 28, and a ceiling and bottom 30, 32 bounding the previously noted area 12 that is used to provide emergency hospital services. As understood, an essential aspect in the construction of a cargo container, and thus a structural feature embodied by the container 20 hereof, is an interconnected metal frame, best illustrated and designated generally by the reference numeral 34 in FIG. 3. Frame 34 includes lifting plates, individually and collectively designated 36, at each of the upper four corners thereof which, in a well understood manner, are adapted to render the unit capable of being airlifted by helicopter to the immediate vicinity of a disaster site.

Such transportation, however, is not deemed sufficient for the use of the hospital unit 10 for emergency treatment, it also being necessary, and thus is another essential aspect underlying the present invention, that the unit 10 be self-transportable on surface roads, as well as being capable of being airlifted in cargo aircraft, such as a C-130. To this end, the hospital unit 10 is provided adjacent its front end, and in an appropriately delineated area, with an internal combustion engine 44 of well understood construction and operational mode in which it powers in rotation a pair of front wheels 46 and 48 and also rear wheels 50 and 52.

Figure 2:
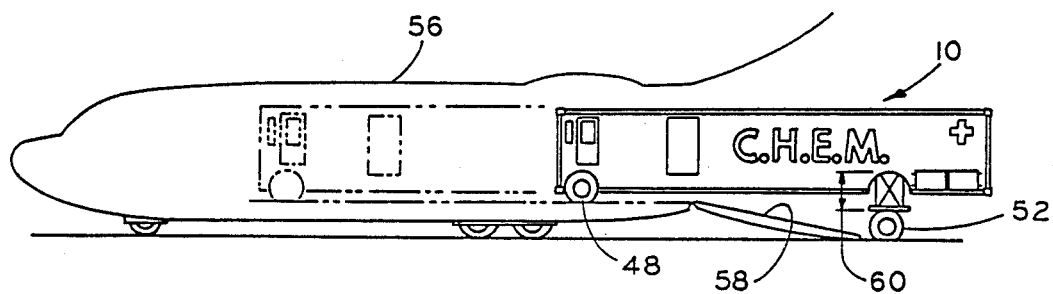
FIG. 2 is a side elevational view illustrating the prior art mode of loading the unit on a cargo aircraft to acheive airlift transportability thereof.

In the operational mode of the unit described and illustrated in my prior U.S. Pat. No. 4,425,978, and as illustrated more particularly herein in FIG. 2, in order for the mobile unit 10 to properly partake of movement either in an ascending or descending relation to the cargo ramp 58, the rear wheels, as exemplified by rear wheel 52, must be urged into the illustrated clearance position in which they are extended the distance 60 beyond that of the front wheels 46, 48 and thus, effectively maintain a horizontal orientation in the mobile unit 10. In this connection, it should be readily appreciated that the referred to horizontal orientation is necessary during loading, even of an empty mobile unit 10, in order to prevent breakage and shifting in position of the medical equipment and supplies therein and, during unloading from the aircraft 56 with any surviving victims, the horizontal orientation in the unit 10 is of course, an absolute necessity in order to prevent any further injury to the survivors.

The essence of the patented unit of the U.S. Pat. No. 4,425,978 was therefore to provide hydraulically-operated wheels 50, 52 having the dual rotational and extending modes as just noted, the same being the result of a well understood operative connection between each of the wheels 50, 52 and a cooperating hydraulic motor for each wheel.

An effective, greatly simplified replacement for the dual functioning prior art rear wheels 50, 52, has surprisingly been found to be a pair of idler wheels 62 journaled for rotation in a conventional well understood manner at the end, as at 64, of hydraulically-operated pistons 66 operating within vertically ascending and descending housings 68. That is, the idler wheels 62 are preferrably electrohydraulic units, such as manufactured by Power-Lift Corp., and can accomodate loads of well over 30,000 pounds and be urged through ascending movement of approximately four feet. Although the technology relating to the construction and operation of the idler wheels 62 are well understood, for completeness sake the discussion pertinent to components 90 and 92 of U.S. Pat. No. 4,181,347 is incorporated herein by reference, as being applicable to the idler rollers 62.

Figure 4:
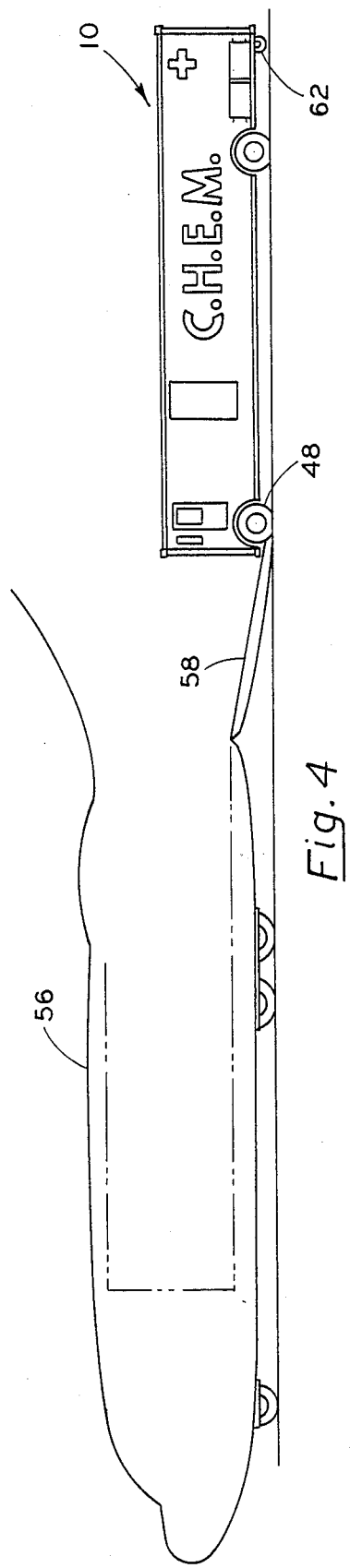
FIGS. 4–6, are side elevational views similar to FIG. 2, but illustrating in sequence the within inventive mode of loading the unit on a cargo aircraft to achieve airlift transportability thereof.
Figure 5:
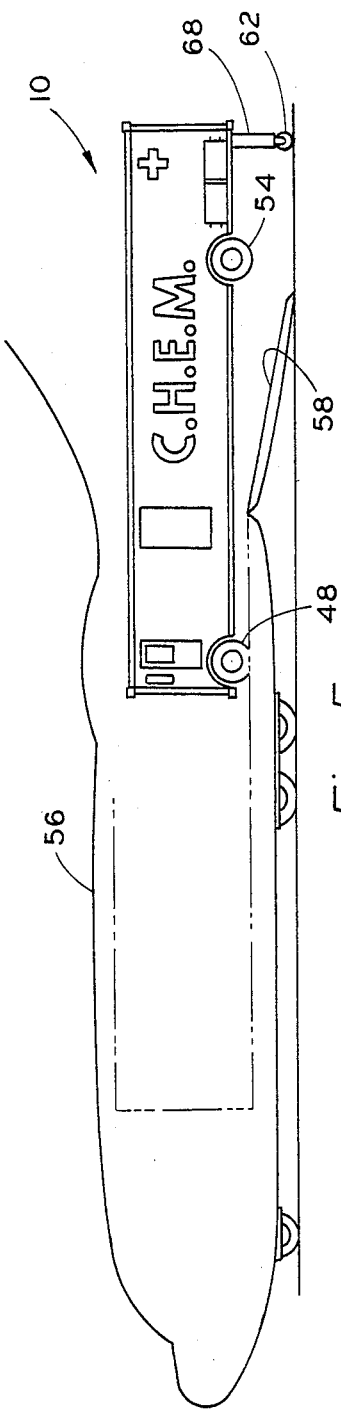
Figure 6:
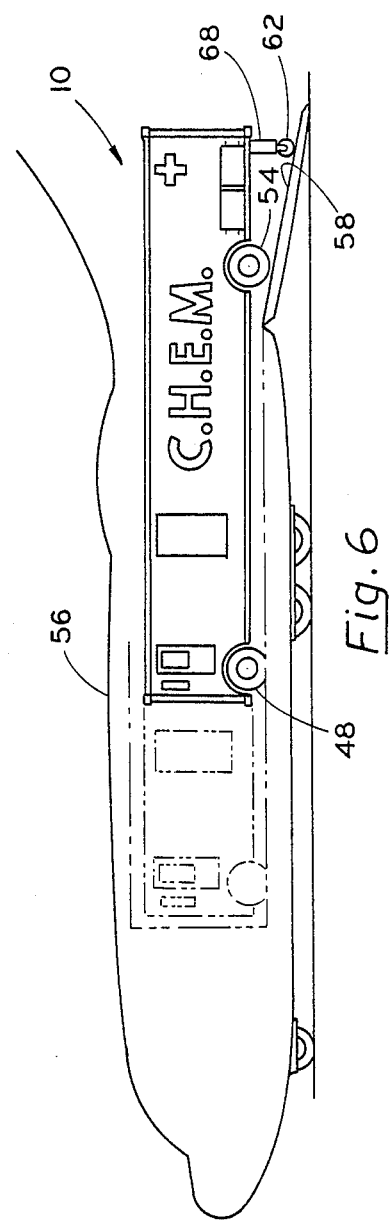

As best illustrated in the sequential views of FIGS. 4–6, inclusive, despite the size and weight of the unit 10, it has been found in practice that the drive of the front wheels 46, 48 is adequate to pull the unit up the inclined loading ramp 58 and, of course, to ease it in an opposite direction down the ramp.

As the unit 10 surmounts the ramp 58, it is of course necessary to appropriately first increase and then lessen the extension of the housings 68, this operating parameter being readily apparent when comparing FIG. 4 with FIG. 5 in which the housings are urged from none to full extension, and when comparing FIG. 5 to FIG. 6 in which the full extension of FIG. 5 is progressively diminished or lessened.

Figure 3:
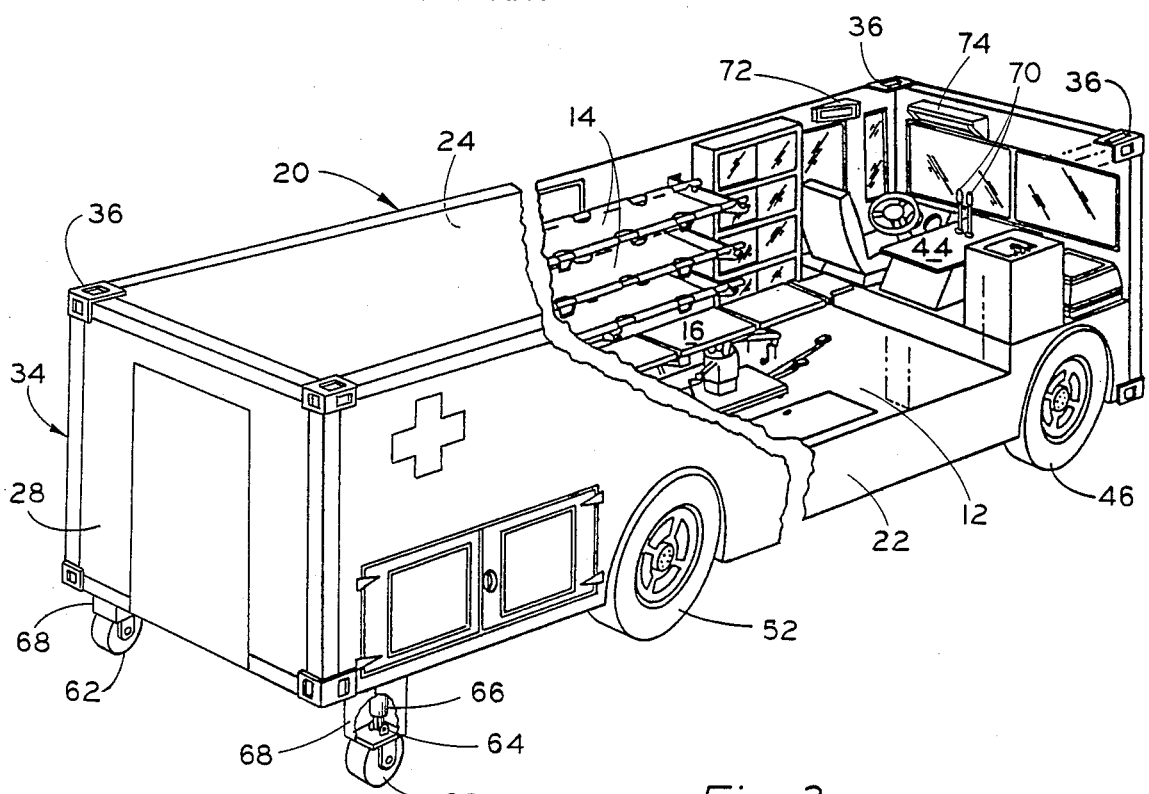
FIG. 3 is another perspective view of the unit, in broken perspective and with external wall portions thereof removed to better illustrate internal structural features thereof.

To exercise the control over the extension and retraction of the idler wheels 62 as just noted, and as best shown in FIG. 3, there is provided in the cab area 12 of the unit 10, and thus under the control of the driver, a pair of throttles 70 which are respectively operatively connected, in a well understood manner, to urge through either descending or ascending movement the left and right pistons 66. In practice, the driver operates the throttles 70 while watching the levels 72 and 74, both of which will be understood to be of conventional construction and operational mode to effectively apprise the viewer of the orientation of the unit 10. Thus, level 72 on the side wall 24 indicates the longitudinal attitude or orientation of the unit 10, while level 74 on the front wall 26 indicates the lateral orientation thereof.

In summary, it should be readily appreciated that there has been described herein a noteworthy mobile hospital unit 10, which utilizes the advantage the capability afforded it by having a body formed of a standard cargo container 20 to be readily transportable to the immediate vicinity of a disaster site and at such site, to thereafter have surface transportability to an immediate adjacent location to the suriving victims by virtue of its embodied four-wheel drive represented by the internal combustion engine-operated front wheels 46, 48 and rear wheels 50 and 52, the referred to four-wheel drive being capable of providing an anticipated maximum speed of 55 miles per hour.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An emergency hospital unit adapted for transportation to, and use at, a site of a major disaster preparatory to providing emergency medical treatment to injured survivors thereat, said unit being comprised of a standard cargo container of the type capable of airlift transportation to a selected location in the immediate vicinity of said disaster site and bounding an internal area of approximately eight feet in width, eight feet in height and forty feet in length for storage of medical equipment and facilities, and a four-wheel drive operatively embodied in the aforesaid container adapted to provide surface transportability thereto for movement of said container from said selected location to said injured survivors, said four-wheel drive consisting of an internal combustion engine-operated pairs of wheels located adjacent the front and rear of said container, and in locations rearwardly of said combustion engine-operated pairs of rear wheels of said container and on opposite sides thereof a cooperating operative arrangement of an idler wheel and of a hydraulic cylinder, said hydraulic cylinders being selectively operable to urge said rear idler wheels from a retracted position through descending movement to maintain a horizontal orientation in said container during which only said front wheels are powered in rotation by said internal combustion engine to cause movement in said container in relation to an inclined loading ramp of an aircarft incident to the airlift transportation thereof, and in said retracted position of said idler wheels, said internal combustion engine being operable to power both said front and rear wheels in rotation to thereby contribute to producing movement in said container, whereby said container has a four-wheel drive for facilitated movement at said disaster site and a horizontal orientation provided by said extended idler wheels during the loading and unloading thereof in relation to an inclined loading ramp incident to the airlift transportation thereof.

2. An emergency hospital unit of the mobile type as defined in claim 1, including devices displaying the longitudinal and lateral orientation of said container mounted in a display position in relation to the operation of the unit, whereby said devices are adapted to assist in the use of said hydraulic cylinders of said idler wheels.

* * * * *